United States Patent
Crawford et al.

(10) Patent No.: US 6,999,797 B2
(45) Date of Patent: Feb. 14, 2006

(54) HANDLE GRIP FOR A MOBILE TERMINAL

(75) Inventors: Christopher N. Crawford, Glen Cove, NY (US); Lawrence J. Dobkowski, East Islip, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 380 days.

(21) Appl. No.: 10/167,975

(22) Filed: Jun. 11, 2002

(65) Prior Publication Data

US 2004/0198241 A1    Oct. 7, 2004

(51) Int. Cl.
*H04B 1/38*    (2006.01)

(52) U.S. Cl. .................. 455/564; 455/90.3; 455/575.1; 455/556.1; 455/344; 455/348; 455/343.6

(58) Field of Classification Search .. 455/575.1–575.9, 455/90.1–90.3, 344, 556.1–557, 569.1, 566, 455/572, 343.1, 343.6, 347–349; 379/454, 379/447; 235/462.01–462.2, 462.49; D14/426–431
See application file for complete search history.

(56) References Cited

U.S. PATENT DOCUMENTS

| | | | |
|---|---|---|---|
| 3,893,144 A * | 7/1975 | Funderburk .................. 396/425 |
| 4,097,883 A * | 6/1978 | Adamski et al. ............. 396/425 |
| 4,405,223 A * | 9/1983 | Shull .......................... 396/420 |
| 5,349,497 A * | 9/1994 | Hanson et al. .............. 361/683 |
| 5,410,141 A * | 4/1995 | Koenck et al. ......... 235/472.02 |
| 5,479,001 A * | 12/1995 | Kumar .................. 235/472.02 |
| 5,636,409 A * | 6/1997 | Akins .......................... 16/422 |
| 5,736,726 A * | 4/1998 | VanHorn et al. ....... 235/472.02 |
| 5,801,918 A * | 9/1998 | Ahearn et al. .............. 361/683 |
| 5,857,148 A * | 1/1999 | Weisshappel et al. ..... 455/575.3 |
| 6,109,528 A * | 8/2000 | Kunert et al. .......... 235/472.01 |
| 6,708,887 B1 * | 3/2004 | Garrett et al. ......... 235/462.45 |
| 2003/0234291 A1 * | 12/2003 | Wulff et al. ........... 235/462.48 |

* cited by examiner

Primary Examiner—Charles Craver
(74) Attorney, Agent, or Firm—Amin & Turocy, LLP

(57) ABSTRACT

The present invention relates generally to an improved handle grip for a mobile terminal such as a personal digital assistant. More specifically, this invention relates to an improved handle grip for a mobile terminal that can be easily secured to and removed from a mobile terminal and provides improved access to the mobile terminal.

26 Claims, 7 Drawing Sheets

HANDLE GRIP FOR A MOBILE TERMINAL

FIELD OF USE

The present invention relates generally to an improved handle grip for a mobile terminal such as a personal digital assistant. More specifically, this invention relates to an improved handle grip for a mobile terminal that can be easily secured to and removed from a mobile terminal and provides improved access to the mobile terminal.

BACKGROUND OF THE INVENTION

Mobile terminals or personal digital assistants ("PDA") are often configured to enable a user to hold it with the palm of the user's hand facing the user. For some applications, it is preferable to configure the mobile terminal to have a gun shaped handle so that the user's hand is extended as if he or she were shaking someone's hand. Instead of designing two different mobile terminal housings to satisfy these two different configurations, it is desirable to develop a removable handle for a mobile terminal. The removable handle can be secured to the mobile terminal to allow a user to grasp the assembly in a first orientation and removed from the mobile terminal to allow a user to grasp the mobile terminal in a second orientation.

Removable handles are also utilized to add certain functionality to the mobile terminal. For instance, the mobile terminal may house an auxiliary battery, a wireless radio, a bar code reading module, RFID tag reader, a modem, global positioning system module, and/or a telephone module. The functionality provided within the handle are used in conjunction with the mobile terminal.

Applicants' co-pending patent application Ser. No. 09/999,004 filed Oct. 24, 2001 discloses various embodiments of a removable handle grip for a mobile terminal device. That application is hereby incorporated by reference into the present case.

SUMMARY OF THE INVENTION

The present invention provides an improved removable handle grip for a mobile terminal, such as a PDA. According to one aspect of the invention, a handle grip can be easily secured to a mobile terminal and easily removed from the mobile terminal.

According to another aspect of the present invention, a handle grip is provided that can be secured to a mobile terminal in a manner that the handle grip contacts only a portion of one surface of the mobile terminal.

According to another aspect of the present invention, a handle grip is provided that can be used in multiple mobile terminals that have different form factor configurations.

According to another aspect of the present invention, a handle grip/mobile terminal assembly is provided that allows signals to pass between the two devices despite relative movement of the devices.

According to another aspect of the present invention, a handle grip is provided that can be secured to a mobile terminal in a manner that the handle grip/mobile terminal assembly is able to withstand impact without disconnecting or breaking.

DETAILED DESCRIPTION OF THE PREFERRED EMBODIMENTS

Figure 1:
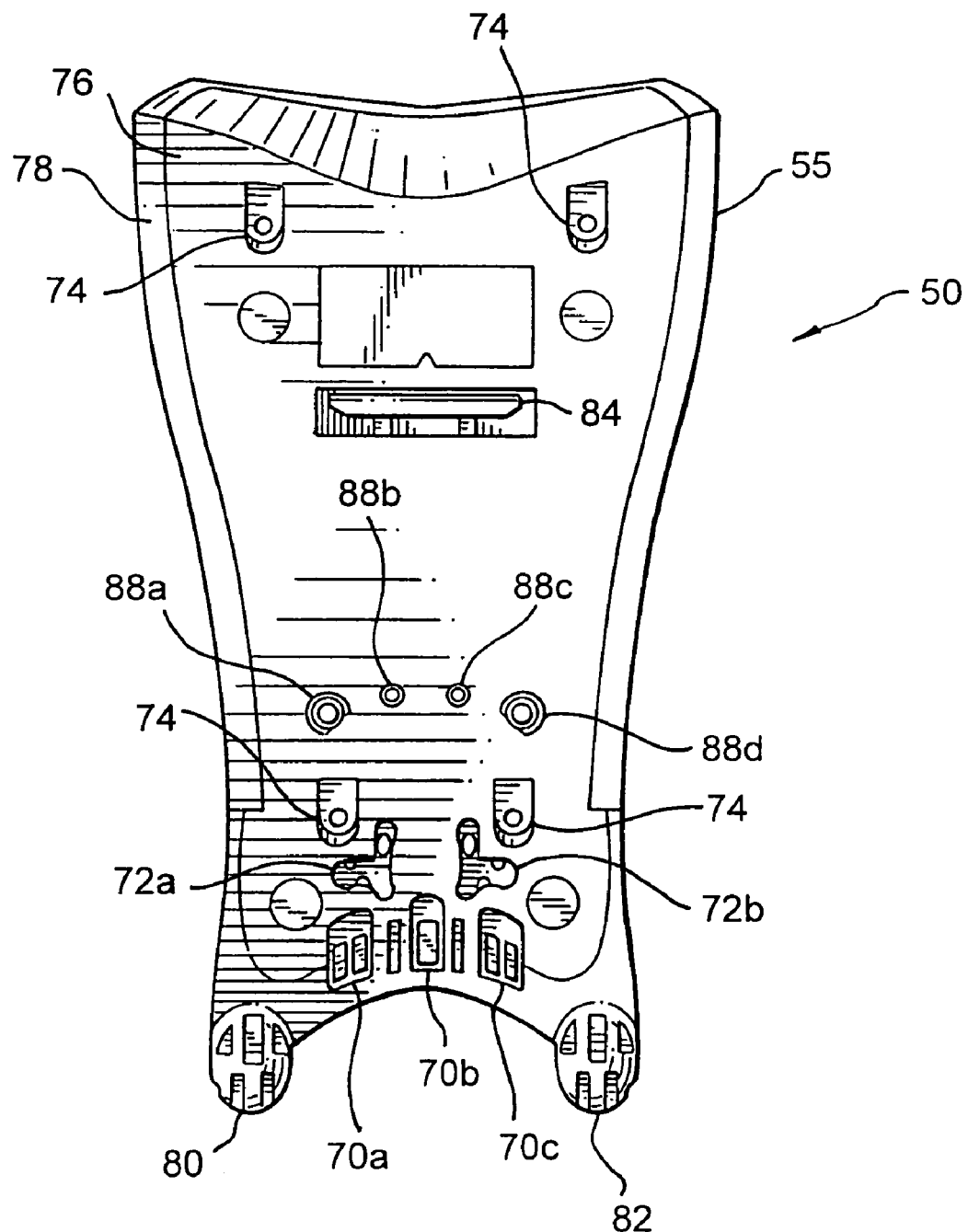
FIG. 1 is a top view of a handle grip of the present invention.
Figure 2:
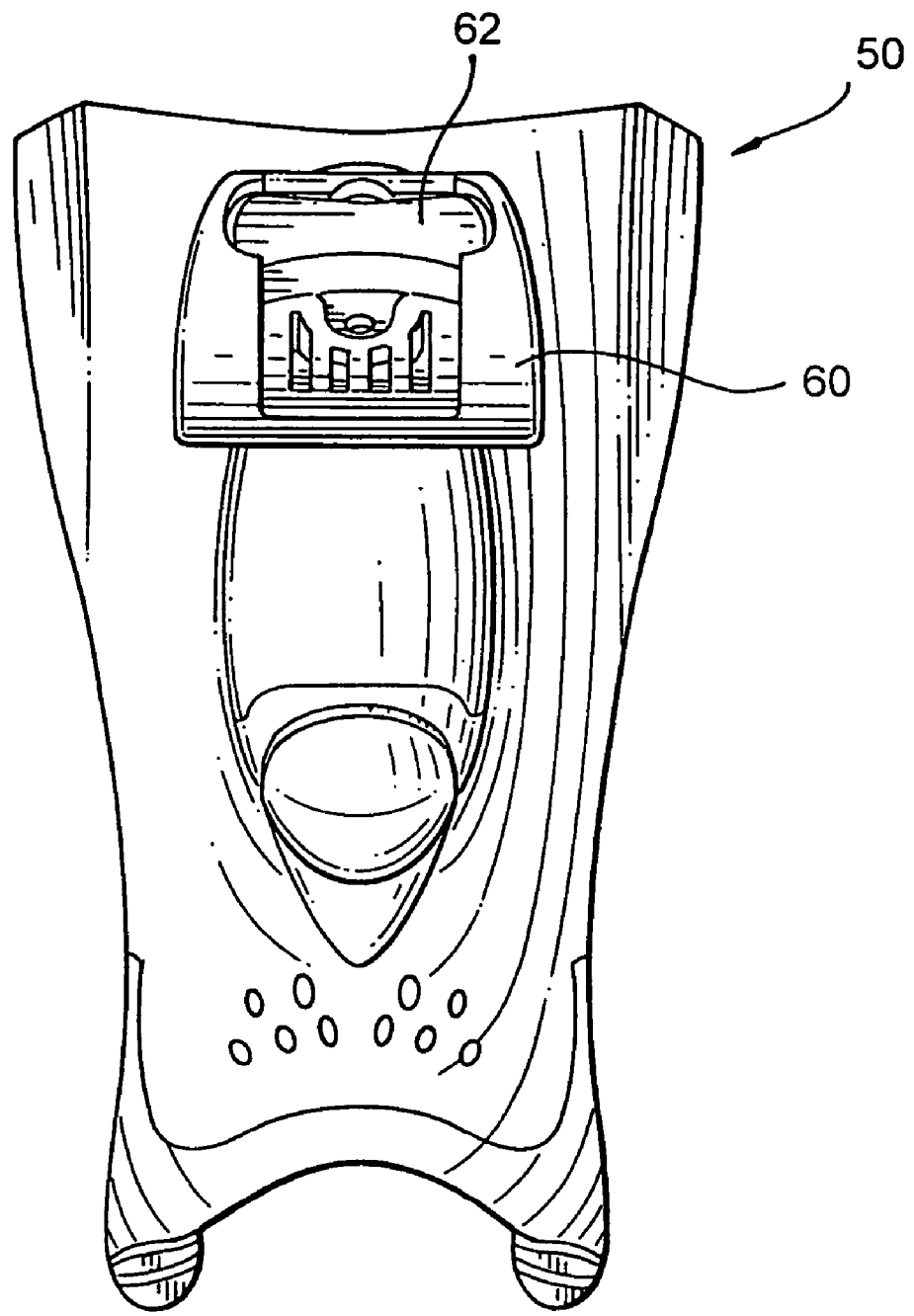
FIG. 2 is a bottom view of the handle grip of the present invention.
Figure 3:
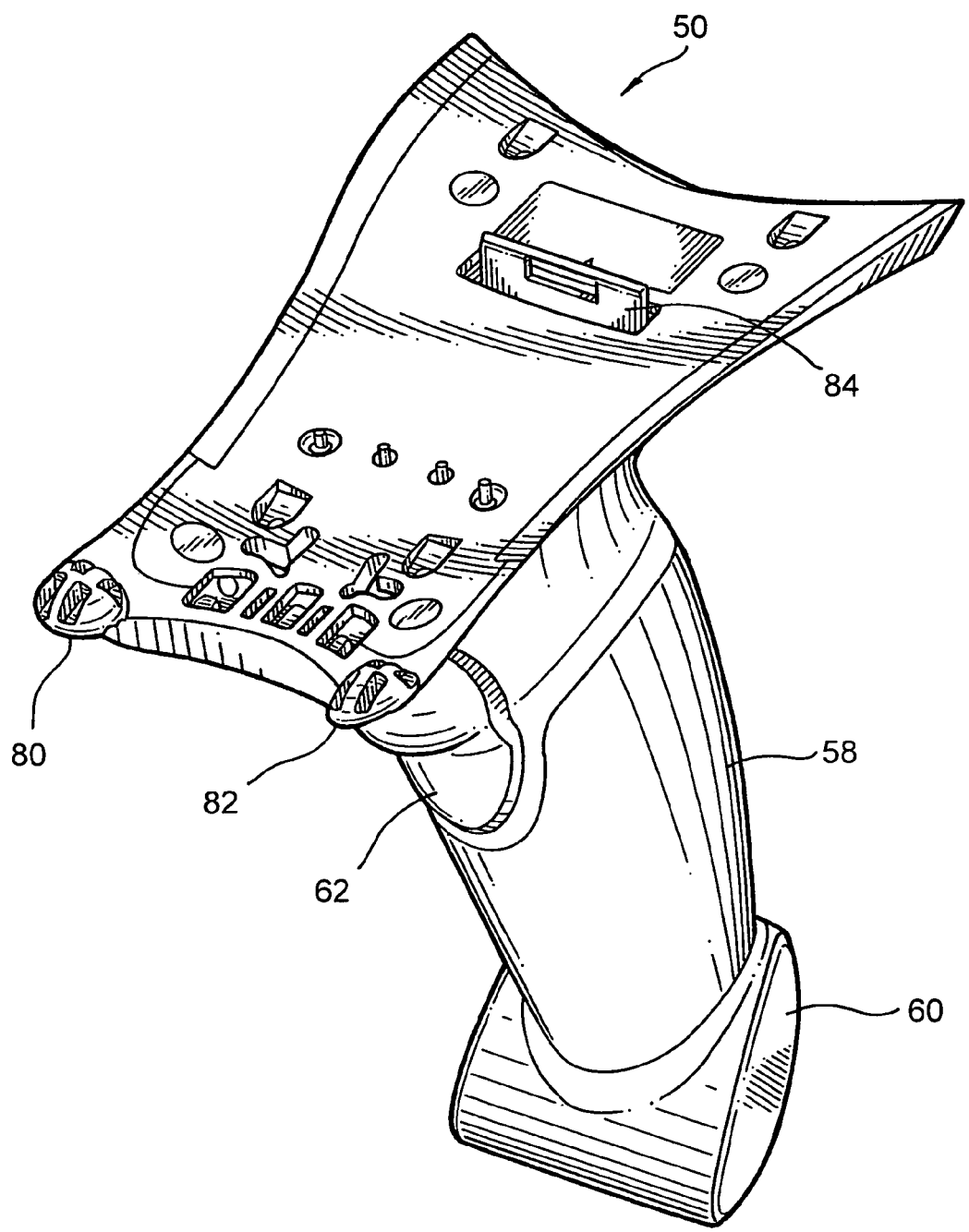
FIG. 3 is an isometric view of the handle grip of the present invention.
Figure 4:
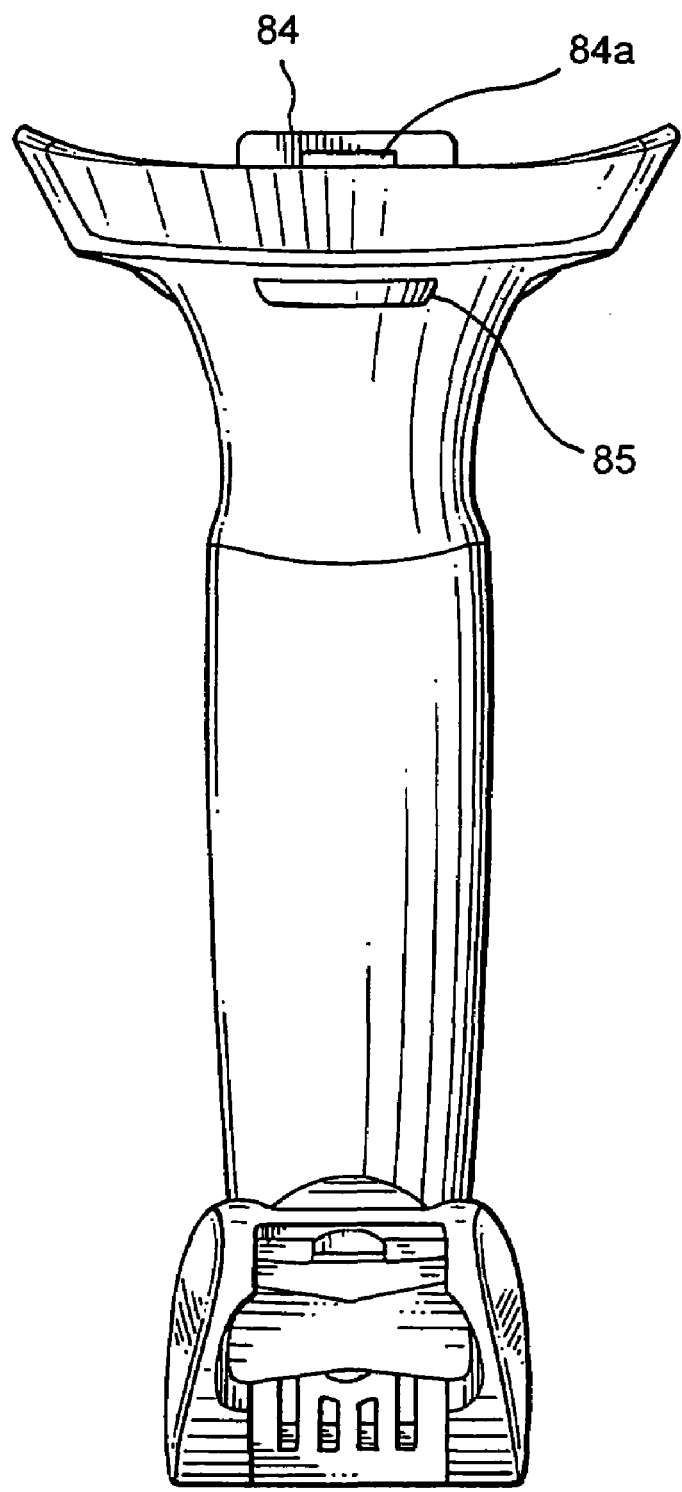
FIG. 4 is a back view of the handle grip of the present invention.

FIGS. 1–4 show a preferred embodiment of a handle grip 50 of the present invention. FIG. 1 shows a top view of handle grip 50. A top surface 55 of handle grip 50 is configured for engagement with a mobile terminal (as described herein). FIG. 2 shows a bottom view of handle grip 50. FIG. 3 shows an isometric view of handle grip 50. FIG. 4 shows a back view of handle grip 50. The portion of handle grip 50 having hook members 80 and 82 will be described herein as the front section of handle grip 50. The side opposite the front section, as viewed in FIG. 1, will be described as the back section of handle grip 50.

Figure 5:
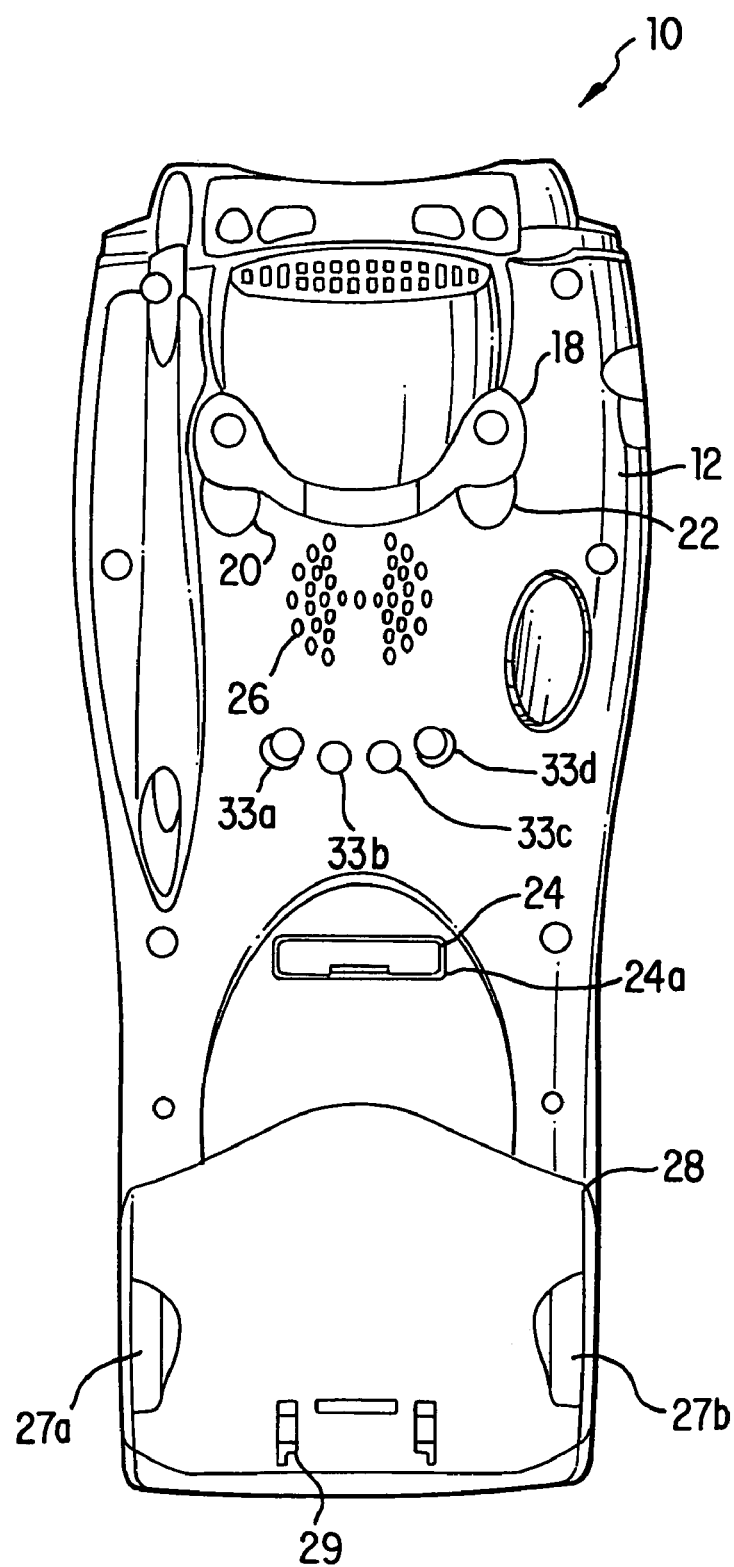
FIG. 5 is a back view of a mobile terminal of the present invention.
Figure 6:
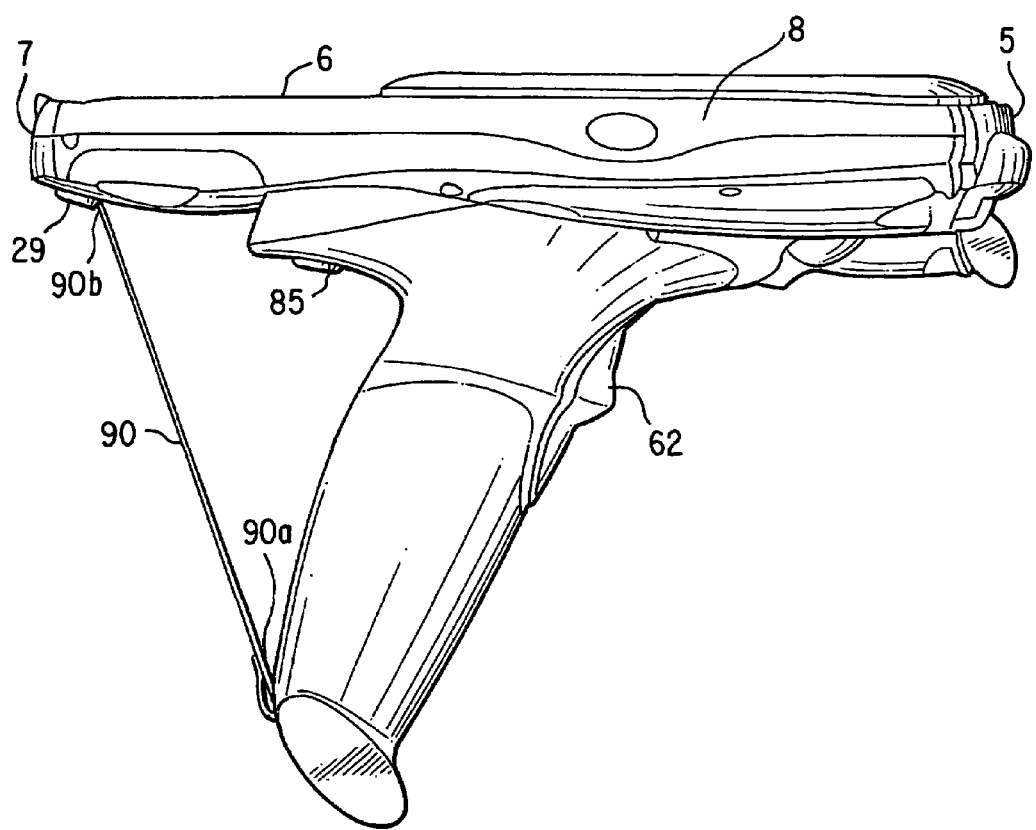
FIG. 6 is a side view of a handle grip and mobile terminal assembly of the present invention including an optional hand strap.
Figure 7:
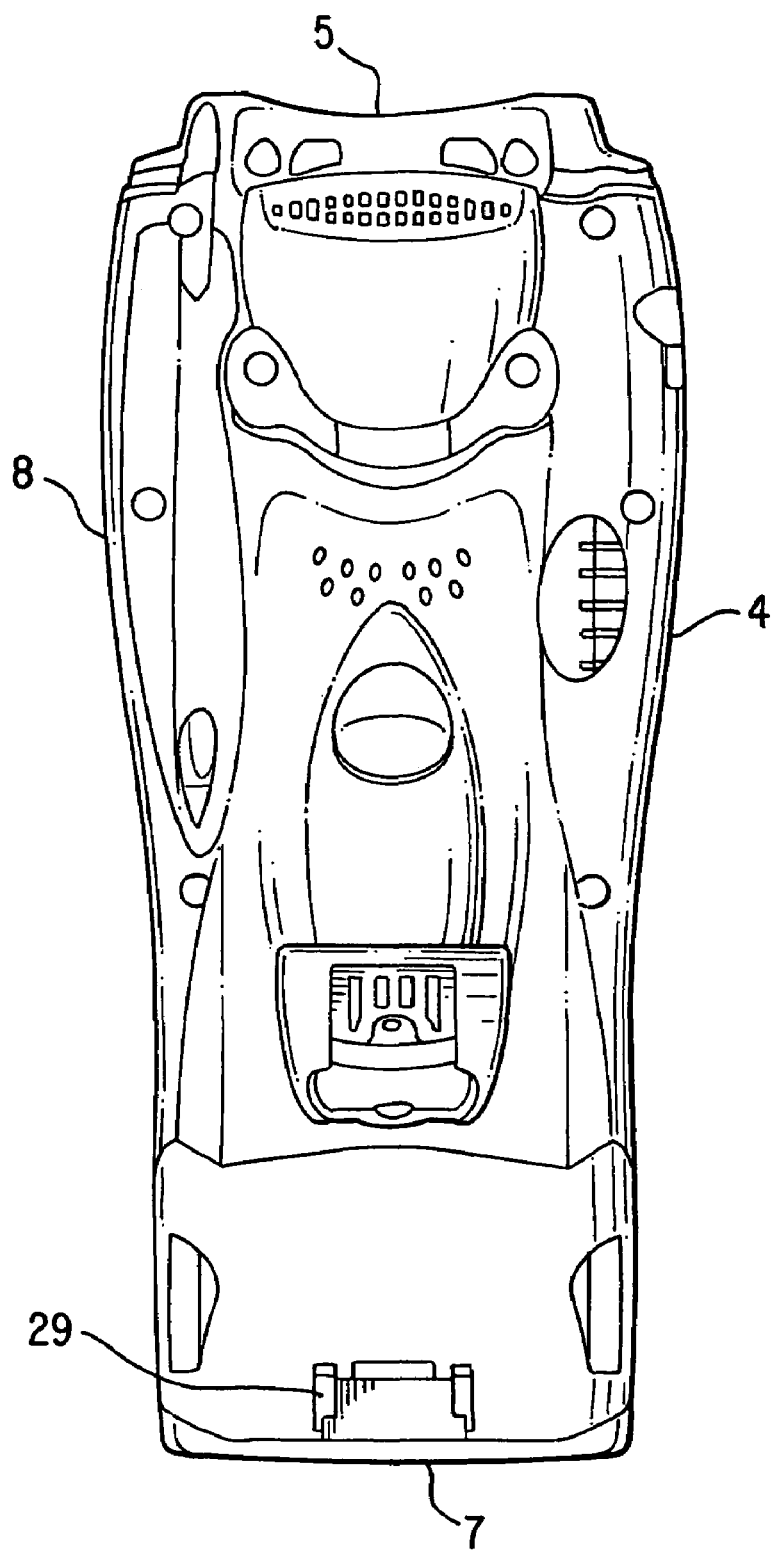
FIG. 7 is a bottom view of the assembly shown in FIG. 6 without the optional hand strap.

FIG. 5 shows a back surface 12 of a mobile terminal 10 according to the present invention. FIGS. 6 and 7 show handle grip 50 engaged in mobile terminal 10. Opposite back surface 12 of mobile terminal 10 is a front surface 6. Mobile terminal 10 also comprises two side sections 4 and 8, a top section 5 and a bottom section 7.

Handle grip 50 includes a handle portion 58 and a trigger button 62. On the bottom of handle portion 58 is a boot 60. Boot 60 provides a surface to rest the bottom of the user's hand. Boot 60 also provides a stable surface area so that mobile terminal 10 and handle grip 50 assembly can rest in a manner that allows a user to easily grasp the assembly. In alternative embodiments, boot 60 may include a communications port to allow communication between external devices and handle grip 50 and/or mobile terminal 10.

Handle grip 50 may include a battery, a wide area network (WAN) radio, a local area network (LAN) radio, a personal area network (PAN) radio, a barcode reading module, RFID tag reader, a modem, global positioning system module, and/or a telephone module.

In a preferred embodiment of the invention, handle grip 50 is composed of a resilient material such as plastic. Handle grip 50 is constructed according to manufacturing processes that are known to those of skill in the art. Handle grip 50 includes relief members 70a, 70b and 70c that facilitate the manufacturing of plastic molded material. Handle grip 50 also includes speaker vents 72a and 72b. Speaker vents 72a and 72b are holes that pass through handle grip 50. Speaker vents 72a and 72b help prevent the handle grip from blocking sound emanating from a speaker within mobile terminal 10. Screws 74 secure two sections of handle grip 50: a top plate 76 and a handle housing 78. Handle grip 50 includes hooks 80 and 82 that protrude in front portion of the handle grip. As shown in FIG. 3, hooks 80 and 82 have a rounded top surface.

Four pogo pins 88a, 88b, 88c and 88d protrude from top plate 76 of handle grip 50. Pogo pins 88a–88d are comprised of a conductive material and provide an electrical contact between circuitry within handle grip 50 and mobile terminal 10. Pogo pins 88a–88d protrude about ⅛ to ¼ inch from top plate 76. A flexible member, such as a spring, secures pogo pins 88a–88d within handle grip 50 such that they can be pushed down flush with top plate 76. Pogo pins 88a–88d may be used to send a signal from handle grip 50 to mobile terminal 10 or from mobile terminal 10 to handle grip 50. For instance, handle grip 50 may send a signal to mobile terminal to activate a barcode reading module on mobile terminal 10, to initiate a data exchange between mobile terminal 10 and another device, or to activate a speaker on mobile terminal 10. In one embodiment of the invention, a battery is housed within handle grip 50 and two or more of the pogo pins are used to supply power to mobile terminal 10. In another embodiment, the pogo pins allow the transfer of power from a battery within mobile terminal 10 to components within handle grip 50.

Also protruding from top plate 76 of handle grip 50 is a release lever 84. As will be described more fully below, release lever 84 is used to secure mobile terminal 10 to handle grip 50. Release lever 84 protrudes about ¼ inch from top plate 76. Within release lever 84 is a slot 84a. Release lever 84 is secured to the handle grip 50 in a manner that allows longitudinal movement (that is, movement between an axis formed by the front and back of handle grip 50) of release lever 84. As shown in FIG. 4, handle grip 50 includes a release button 85. Release button 85 is coupled to release lever 84 and allows a user to actuate the movement of release lever 84. Handle grip 50 includes a spring mechanism that restores release lever 84 to an initial position after it is displaced by engaging release button 85.

FIG. 5 shows back surface 12 of mobile terminal 10. Mobile terminal 10 includes recesses 20 and 22. A bar member 18 traverses recesses 20 and 22. A portion of bar member 18 protrudes over recesses 20 and 22 to form a lip over recess 20 and recess 22. Those skilled in the art would recognize that the recesses and lip configuration described herein could be formed by a number of other techniques without departing from the nature of the present invention. For instance, an alternative embodiment of the present invention comprises an elongated single recess formed in the mobile terminal housing.

Bar member 18 can also be used to affix accessories such as a belt clip or a hand strap. As is known in the art a front end of a hand strap can be looped around bar member 18. The looped hand strap can then be secured to itself via a fastener such as snaps or Velcro.

Mobile terminal also includes speaker vents 26 that prevent the housing of mobile terminal 10 from blocking sound emanating from the speaker within mobile terminal 10. Pogo pin contacts 33a, 33b, 33c and 33d are configured to receive pogo pins 88a–88d of handle grip 50. A latch block 24 is formed within a recess of back surface 12 of mobile terminal 10. Latch block 24 is preferably comprised of a metallic material. Latch block 24 is configured to include a lip member 24a that protrudes into the recess of back surface 12. Mobile terminal 10 also includes a battery door 28 for accessing the battery that provides the power to mobile terminal 10. Battery door 28 is locked onto housing of mobile terminal 10 via latches 27a and 27b. Battery door 28 includes a hand strap latch 29. When handle grip 50 is not secured to mobile terminal 10, a front end of the hand strap can be secured to bar member 18 and a back end of the hand strap can be secured to hand strap latch 29.

The attachment of handle grip 50 to mobile terminal 10 will now be described with reference to FIGS. 1 and 5. To attach handle grip 50, a user inserts hooks 80 and 82 into recesses 20 and 22, respectively. Hooks 80 and 82 and recesses 20 and 22 are configured such that when engaged, they act as pivot points. The rounded surfaces of hooks 80 and 82 and recesses 20 and 22 allow a snug fit between the surfaces while allowing rotational movement there between. The user then rotates handle grip 50 and mobile terminal 10 toward one another. As release lever 84 of handle grip 50 comes in contact with lip member 24a of mobile terminal 10, lip member 24a displaces release lever 84 toward the front of handle grip 50. In a preferred embodiment of the invention, the upper portion of release lever 84 is slightly angled to facilitate the displacement of release lever 84 as it comes in contact with lip member 24a. After slot 84a of release lever 84 passes lip member 24a, release lever 84 locks into position by moving back toward the back of handle grip 50. In the locked position, lip member 24a occupies a substantial amount of the area created by slot 84a. It is recognized that other latching mechanisms could be employed to lock the mobile terminal to the handle grip without departing from the nature of the present invention.

In the locked position pogo pins 88a–88d engage with pogo contacts 33a–33b, respectively. Thus, signals can pass between handle grip 50 and mobile terminal 10. The pogo pin contact configuration of the present invention allows signals to pass between the two devices even in environments wherein there is vibration or movement of handle grip 50 and mobile terminal 10.

FIGS. 6 and 7 show handle grip 50 engaged with mobile terminal 10. As shown, the handle grip 50/mobile terminal 10 assembly is preferably configured such that handle grip 50 only engages one side of mobile terminal 10. Thus a user has complete access to the front, sides, top and bottom of mobile terminal 10 and limited access to back portion 12 of mobile terminal. In addition, this configuration enables accessories to be easily added to mobile terminal 10. Such accessories could include a magnetic strip reading module, a wireless radio module, an extra duty battery or an imaging module. These accessories are typically secured to one or more sides of mobile terminal 10. For instance, a module for reading a magnetic stripe could be secured to five sides of the lower section of mobile terminal 10 without any interference from handle grip 50. Likewise, an extra thick that protrudes from the back of the bottom portion of mobile terminal 10 can be attached to the terminal without any interference from handle grip 50. Similarly, different barcode scanning modules that have different thickness can be installed on the top portion of the terminal without interfering with handle grip 50.

In addition, handle grip 50 can be secured to many different types of mobile terminals. Only the back of the terminal needs to be configured for engagement with handle grip 50. Thus, handle grip 50 can be secured to a terminal regardless of the terminal's length, width or thickness.

In order to detach mobile terminal 10 and handle grip 50 a user engages release button 85. This causes release lever 84 to move toward the front of handle grip 50 allowing release lever 84 to pass lip member 24a of mobile terminal 10. After the user rotates the back of handle grip 50 away from the back of mobile terminal 10, the user can then disengage hooks 80 and 82 from recesses 20 and 22.

The present invention provides a rugged handle grip/mobile terminal assembly that is able to withstand significant impact. Once handle grip 50 is secured to mobile terminal 10, the two devices are not easily separated without engaging release button 85.

As described above, when handle grip 50 is not secured to mobile terminal 10, a front end of the hand strap can be secured to bar member 18 and a back end of the hand strap can be secured to hand strap latch 29. However, when handle grip 50 is engaged with mobile terminal 10, the hand strap cannot be secured in this manner.

As shown in FIG. 6, the present invention enables a hand strap 90 to be employed when handle grip 50 is engaged with mobile terminal 10. Hand strap 90 includes a back end portion 90*b* that is secured to hand strap latch 29. As shown in FIG. 2, boot 60 includes a boot hand strap latch 62. Boot hand strap 62 is configured to receive a front end 90*a* of hand strap 90. Front end 90*a* loops around boot hand strap 62. A fastener secures the looped around portion to a portion of the hand strap. The fastener can be any of various types known to those of skill in the art, i.e., snaps or Velcro. When hand strap 90 is secured to the handle grip 50/mobile terminal 10 assembly, hand strap 90 can be used to secure the assembly to a belt clip or other retaining devices. As described above, when handle grip 50 is not in use, front end 90*a* can be looped around bar member 18. Thus, hand strap 90 can be used when handle grip is in use or not in use.

What is claimed is:

1. A mobile computing system comprising:
   a mobile terminal having a back housing, said back housing comprising one or more recesses, a latch member and a plurality of conductive contacts; and
   a handle grip comprising one or more hook members configured for engagement with the one or more recesses of the mobile terminal, one or more speaker vents, a release lever configured for engagement with the latch member of the mobile terminal, and a plurality of conductive pins configured for engagement with the plurality of conductive contacts on the mobile terminal; and
   wherein the handle grip is secured to the mobile terminal by inserting the one or more hook members into the one or more recesses farming a pivot point and rotating the handle grip and the mobile terminal toward each other along said pivot point until the release lever engages the latch member.

2. The mobile computing system of claim 1 wherein the plurality of conductive pins are flexibly secured to the handle grip such that the conductive pins can be pushed down toward the back housing.

3. The mobile computing system of claim 1 wherein the handle grip includes a release button to disengage the release lever and the latch member.

4. The mobile computing system of claim 1 wherein the one or more hook members are on a front portion of the handle grip.

5. The mobile computing system of claim 1 wherein the one or more hook members have a rounded top surface.

6. The mobile computing system of claim 1 wherein a bottom of the handle grip includes a hand strap latch for receiving an end of a hand strap.

7. The mobile computing system of claim 1 wherein the mobile terminal includes a battery door for accessing a battery and wherein the handle grip does not interfere with accessing the battery.

8. The mobile computing system of claim 1 wherein the handle grip comes in contact with only the back housing of the mobile terminal.

9. The mobile computing system of claim 1 wherein the mobile terminal includes a bar code reading module and wherein the handle grip includes a trigger for actuating the bar code reading module.

10. A handle grip for communicating with a mobile terminal, the mobile terminal having a back housing, the back housing comprising one or more recesses, a latch member and a plurality of conductive contacts, said handle grip comprising:
    one or more sneaker vents;
    a trigger for activating a function on the mobile terminal;
    one or more hook members configured for engagement with the one or more recesses of the mobile terminal,
    a release lever configured for engagement with the latch member of the mobile terminal;
    a plurality of conductive pins configured for engagement with the plurality of conductive contacts on the mobile terminal;
    wherein the handle grip is secured to the mobile terminal by inserting the one or more hook members into the one or more recesses forming a pivot point and rotating the handle grip and the mobile terminal toward each other along said pivot point until the release lever engages the latch member.

11. The handle grip of claim 10 wherein the plurality of conductive pins are flexibly secured to the handle grip such tat the conductive pins can be pushed down toward the back housing.

12. The handle grip of claim 10 wherein the handle grip includes a release button to disengage the release lever and the latch member.

13. The handle grip of claim 10 wherein the one or more hook members are on a front portion of the handle grip.

14. The handle grip of claim 10 wherein the one or more hook members have a rounded top surface.

15. The handle grip of claim 10 wherein a bottom of the handle grip includes a hand strap latch for receiving an end of a hand strap.

16. The handle grip of claim 10 wherein the mobile terminal includes a battery door for accessing a battery and wherein the handle grip does not interfere with accessing the battery.

17. The handle grip of claim 10 wherein the handle grip comes in contact with only the back housing of the mobile terminal.

18. The handle grip of claim 10 wherein the mobile terminal includes a bar code reading module and wherein the trigger actuates the bar code reading module.

19. A handle grip for communicating with a mobile terminal, the mobile terminal having two side surfaces defining a width of the mobile terminal, a top surface and a bottom surface defining a length of the mobile terminal and a front surface and a back surface, the back surface having one or more recesses, a latch and a plurality of conductive contacts, said handle grip comprising:
    one or more speaker vents;
    a trigger for activating a function on the mobile terminal;
    one or more hook members configured for engagement with the one or more recesses of the mobile terminal,
    a release lever configured for engagement with the latch of the mobile terminal;
    a plurality of conductive pins configured for engagement with the plurality of conductive contacts on the mobile terminal;
    wherein the handle grip is secured to only the back surface of the mobile terminal by inserting the one or more hook members into the one or more recesses farming a pivot point and rotating the handle grip and the mobile terminal toward each other along said pivot point until the release lever engages the latch.

20. The handle grip of claim 19 wherein the plurality of conductive pins are flexibly secured to the handle grip such that the conductive pins can be pushed down toward the back housing.

21. The handle grip of claim 19 wherein the handle grip includes a release button to disengage the release lever and the latch member.

22. The handle grip of claim 19 wherein the one or more hook members are on a front portion of the handle grip.

23. The handle grip of claim 19 wherein the one or more hook members have a rounded top surface.

24. The handle grip of claim 19 wherein a bottom of the handle grip includes a hand strap latch for receiving an end of a hand strap.

25. The handle grip of claim 19 wherein the mobile terminal includes a battery door for accessing a battery and wherein the handle grip does not interfere with accessing the battery.

26. The handle grip of claim 19 wherein the mobile terminal includes a bar code reading module and wherein the trigger actuates the bar code reading module.

* * * * *